Oct. 4, 1949.　　　　　F. W. GAY　　　　　2,483,896
HOUSE HEATING SYSTEM
Filed March 9, 1945　　　　　　　　　　　5 Sheets-Sheet 1

INVENTOR.
Frazer W. Gay,
BY George D. Richards
Attorney

Oct. 4, 1949.    F W. GAY    2,483,896
HOUSE HEATING SYSTEM
Filed March 9, 1945    5 Sheets-Sheet 2

INVENTOR.
Frazer W. Gay
BY George D. Richards
Attorney

Oct. 4, 1949.　　　　　F. W. GAY　　　　　2,483,896
HOUSE HEATING SYSTEM

Filed March 9, 1945　　　　　　　　　　5 Sheets-Sheet 3

INVENTOR.
Frazer W. Gay
BY George D. Richards
Attorney

Oct. 4, 1949.                    F. W. GAY                    2,483,896
                             HOUSE HEATING SYSTEM
Filed March 9, 1945                                        5 Sheets-Sheet 4
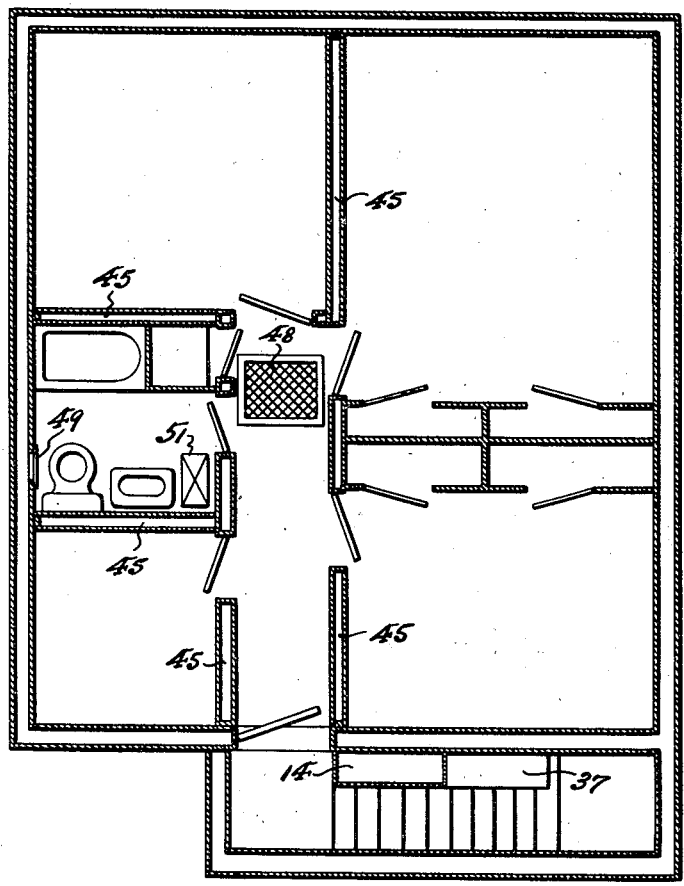
Fig. 6
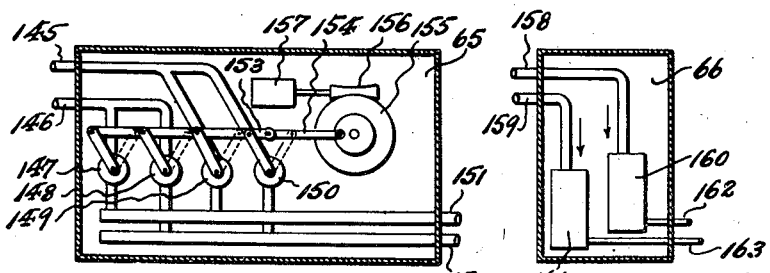
Fig. 7                                  Fig. 8
INVENTOR.
Frazer W. Gay
BY George D. Richards
Attorney Oct. 4, 1949.          F. W. GAY          2,483,896
HOUSE HEATING SYSTEM
Filed March 9, 1945                    5 Sheets-Sheet 5

INVENTOR.
Frazer W. Gay
BY George D. Richards
Attorney

Patented Oct. 4, 1949

2,483,896

UNITED STATES PATENT OFFICE 2,483,896

HOUSE HEATING SYSTEM

Frazer W. Gay, Metuchen, N. J.

Application March 9, 1945, Serial No. 581,859

8 Claims. (Cl. 257—8)

This invention relates to a novel system of house heating by means of a heat pump.

The present invention has for an object to provide a house heating system which includes a heat pump that is adapted to perform in the usual manner to cool the house in summer, but which is so arranged in the system that in winter it will function to catch heat escaping from the house and regenerate it, i. e. raise its temperature and then return said heat to the house interior.

Such recapture and regeneration of heat is made possible by surrounding the house with spaced insulating shells or walls, whereby to provide a thin air space therebetween. It will be obvious that substantially all heat attempting to escape from the house interior must pass through said air space. By recirculating the air from said space through the evaporator of a heat pump, a portion of the heat is absorbed by the evaporator, and is pumped into the condenser and enters a recirculating air stream which includes the interior of the house in its recirculation course.

In my novel system, I propose to provide a large steel tank for hot water storage, together with means to maintain the stored water at a high temperature, and means to use the stored heat to supplement the electric pumped heat during very cold weather.

The electric heat pump as employed in my novel system will operate successfully down to an evaporator surface temperature just above 32 degrees F., and, to maintain this minimum temperature, a supply of air must be provided at a temperature not below 40 degrees F.

In my system a thermostat is provided in the air stream recirculating in the space between the aforesaid insulating shells or walls, and this thermostat operates means to cause heat in the stored water to be made available to said air stream before the temperature of the latter falls below 40 degrees F. The thermostat is set to shut off the heat when the air in said air stream reaches about 45 degrees F.

It will be apparent that if no source of cheap fuel is available, the electric heat pump and electrically generated heat must be used to raise the temperature of the air recirculated through and from the air space between the aforesaid insulating shells or walls. The applied heat, if an all electric system is used, may be introduced directly into the air circulating within the house interior, or directly into the air stream moving between the aforesaid insulating shells or walls. The total losses are substantially the same in either case.

My novel system and included heat pump permits an all electric heating method to be employed down to the lowest temperatures normally prevailing in the northeastern metropolitan districts of the United States. In these districts the winter temperature varies from 10 degrees F. up, but in occasional extremes it reaches zero or somewhat below.

A further object of this invention is to provide a house heating system including means for intercepting heat in its flow from the interior of a house to outdoors so that this heat may be recaptured and regenerated and forcibly returned to the house interior, and to this end to provide an inner insulating shell or wall contiguous to the warm house interior and a spaced outer insulating shell or wall containing a substantial layer of fluid air, together with means to recover heat, conducted through the inner shell or wall from the warm house interior, as such heat permeates said layer of fluid air, and thereupon return the recovered heat to the house interior.

A further object of this invention is to provide, in a system including in connection with means to form a thin envelope of air substantially enclosing the interior of the house, a working chamber as a part of such envelope, and to include in this working chamber and envelope substantially all combustion equipment, such e. g. as the working parts of a gas refrigerator, or gas water heaters, pot stoves, etc., whereby all objectionable odors or possibility of odors, and direct heat are removed from the living quarters of the house interior.

Another object of the invention is to provide two circulating fluid mediums and means to transfer heat from one to the other; and heat storage means to make available a greater heat flow during certain desired periods.

Still another object of the invention is to provide, in the house heating system as above characterized, a storage tank for hot water to work in cooperation with a heat pump, so that, during periods of high heat demand, the heat pump will operate to maintain the house interior at a substantially constant temperature, and so that the heat storage will supply heat increasing in amount with and substantially in proportion to the fall or drop of outdoor temperature below the limiting outdoor capability temperature of the heat pump alone; auxiliary heat generating means being provided to maintain the temperature of the stored water at a high value.

Other objects of this invention, not at this time more particularly enumerated, will be understood from the following detailed description of the same.

The invention is clearly illustrated in the accompanying drawings, in which:

Fig. 6 is a second floor plan.

Fig. 7 is a cross section in elevation of the valve box 65 in Fig. 1 taken along the line 7—7.

Fig. 8 is an arrangement in corresponding section of the adjacent expansion valve box 66 shown in Fig. 1.

Figure 1:
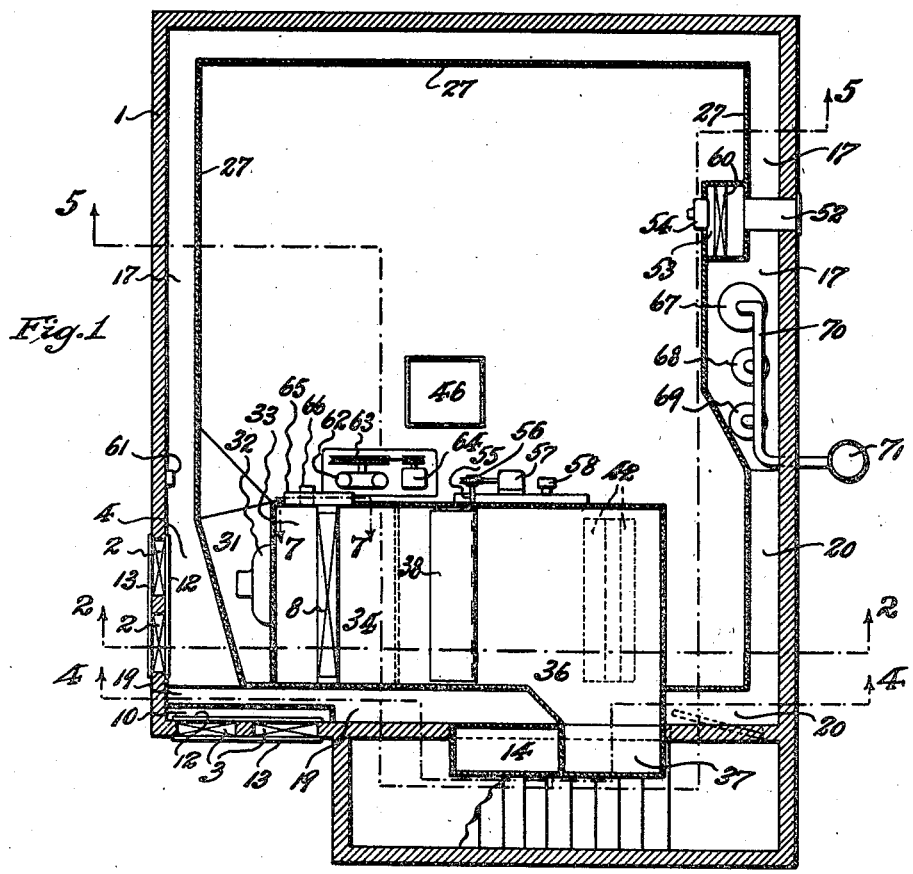
Fig. 1 is a plan view of the basement of the proposed house taken along line 1—1 of Fig. 2.
Figure 2:
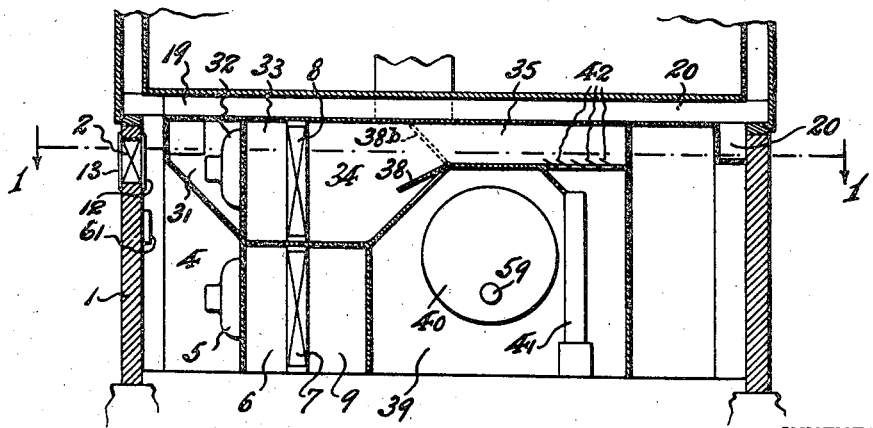
Fig. 2 is an elevation in section taken along the line 2—2 in Fig. 1.
Figure 3:
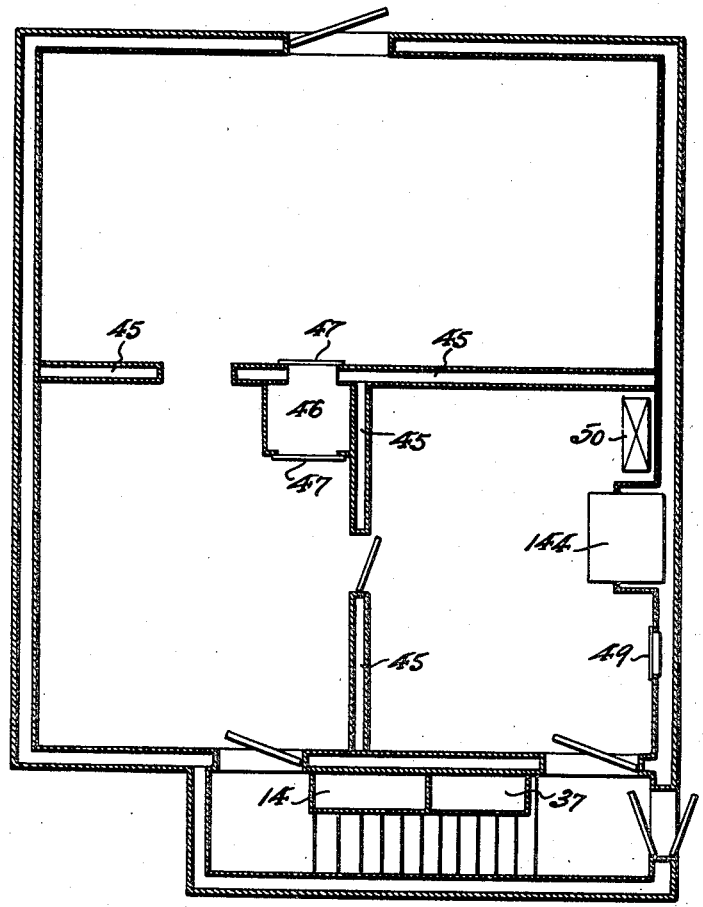
Fig. 3 is a first floor plan.
Figure 4:
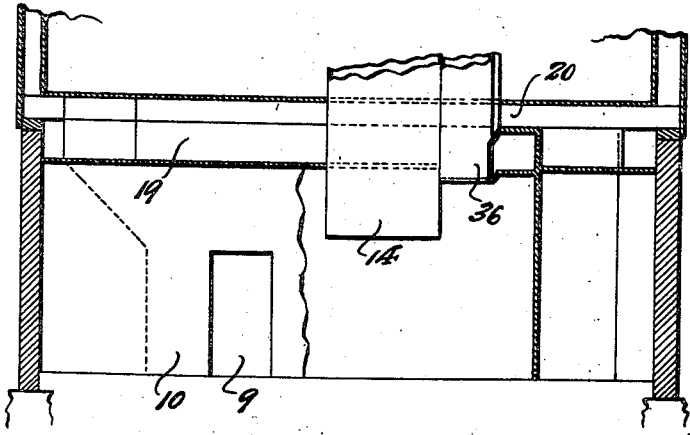
Fig. 4 is an elevation in section taken along the line 4—4 in Fig. 1.

In Figs. 1 and 2 outdoor air enters in warm weather through windows 2, 2, passes through chamber 4 to fan 5. Fan 5 drives this air into chamber 6 and through heat exchanger 7 into chamber 9. The air enters chamber 10 (beneath duct 19) from chamber 9 and passes out of windows 3, 3, carrying away heat which it received from heat exchanger 7.

Figure 5:
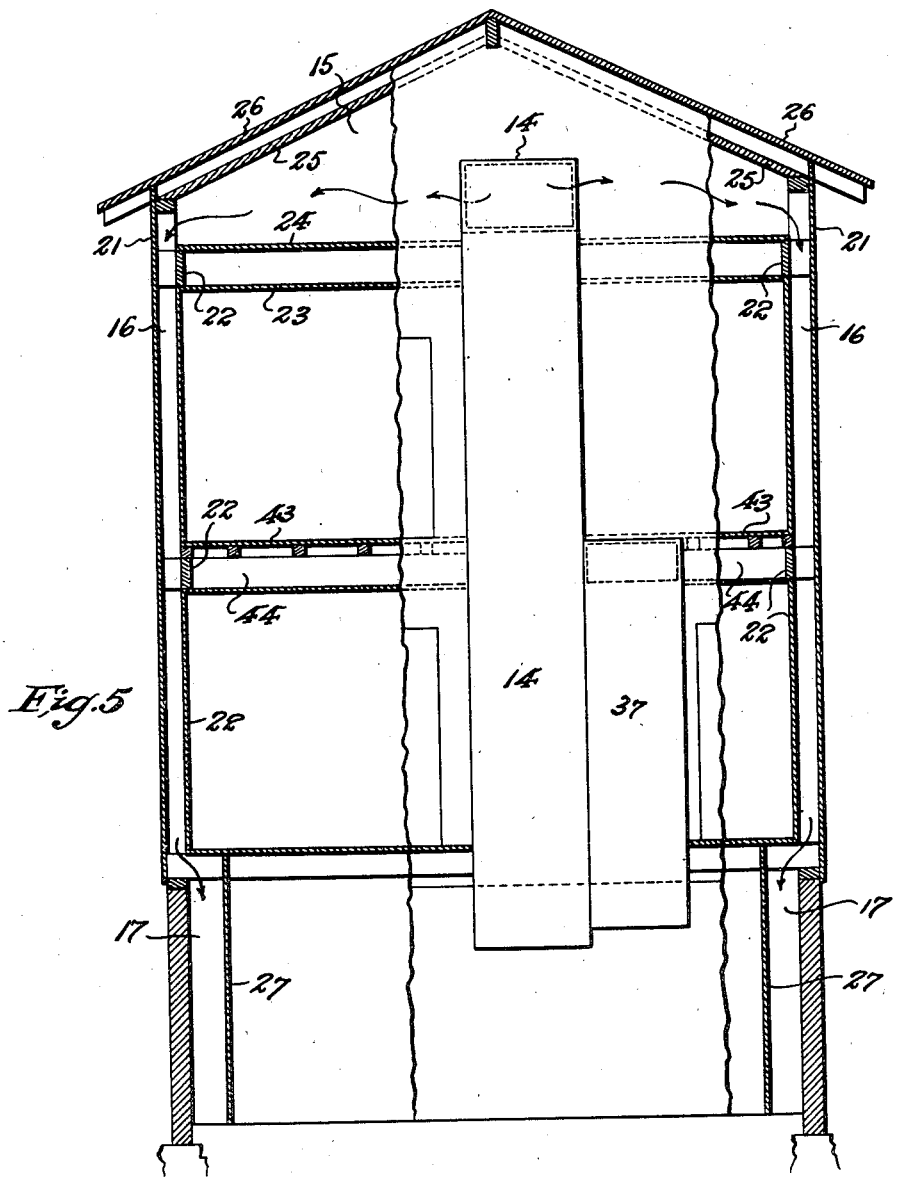
Fig. 5 is an elevation partly in section taken along the line 5—5 of Fig. 1.

The house conditioning air reaches the basement from shaft 46, enters chamber 31 from the basement and is driven by fan 32 into chamber 33, through heat exchanger 8 into chamber 34. From chamber 34 the air has two possible circuits. One directly into box 35 (Fig. 2), and the other through damper 38 into hot box 39 around the large hot water storage tank 40 (hot only in cool or cold weather) through radiator 41, and through the light aluminum flaps 42, 42, 42 which are lifted by the hot air driven through damper 38. The house conditioning air then enters horizontal duct 36 and is carried to vertical duct 37 (Fig. 5).

Motor 57 opens and closes damper 38 slowly by working through worm and worm wheel 56 to turn the operating shaft 55. When damper 38 is in the position 38b, all the house air conditioning air stream passes through the hot box, and the maximum heating condition is reached. The large automatic hot water storage tank 40 is heated by the two side arm gas hot water heaters 68 and 69 in the usual manner. These heaters together with the year around service water heater 67 are located in the regenerative air stream passage 17.

This collecting air passage 17, together with the two small collecting air passages 19 and 20 on the stair well end of the basement, collect all air coming down to the basement through the outside wall ducts, and carry this air to the intake chamber 4 in cold weather. In cold weather windows 2, 2 and 3, 3 are battened closed on the inside by insulating boards 12, 12 and on the outside by insulating boards 13, 13. A gas pump 62 is driven through pulleys and belt 63 by motor 64. This gas pump receives gas from valve cabinet 65 and returns the compressed gas to valve cabinet 65 shown in detail in Fig. 7. Valve cabinet 65 functions to deliver hot compressed gas to heat exchanger 8 to be cooled and condensed by the house air conditioning air stream when the house is to be heated by the heat pump. Simultaneously the valve cabinet connects heat exchanges 7 to the intake of the gas pump 62 to act as an evaporator so that the refrigerant in heat exchanger 7 evaporates, becomes cold and absorbs heat from the air circulating in the outside walls. Cabinet 65 contains two expansion valves one for each of the heat exchangers 7 and 8. Each valve is one way, and valves the condensed refrigerant from the condenser into the evaporator. A high capacity electric heater 59 is controlled by the thermostat 58.

Fresh air enters chamber 53 through pipe 52. In chamber 53 the air is filtered by air filter 60. Variable speed fan 54 blows the fresh air into the basement. From the basement the house air conditioning air stream passes through the air conditioning equipment, as explained, to duct 36.

Figs. 3, 4, 5 and 6 show the method of distributing the house air conditioning stream and the regenerative air stream. The regenerative stream passes from compartment 10 to the attic by way of conduit 14 (Fig. 5). In the attic this air stream distributes itself to the space between the wall studs on all four walls and passes down between the studs and between the outside insulating shell or wall 21, 21, etc. and the inside insulating shell or wall 22, 22, etc. This stream of air, in cold weather absorbs heat passing through the inside shell of insulation 22, 22 and gives up part of this heat to heat exchanger 7. The balance passes out through the outside insulating shell. The house air conditioning air stream passes from compartment 36 (Fig. 1) up duct 37 (Fig. 5) to the space between the floor of the second floor and the ceiling of the first floor, and returns from the several rooms to the basement through air shaft 46. Referring to the first floor (Fig. 3) the warm air passes from the ceiling down in the spaces 45, 45, 45 between the studs in the interior partitions, and enters the rooms at the base board. It enters air shaft 46 through register 47, 47. Referring to the second floor (Fig. 6), the warm air enters the spaces 45, 45, etc. in the interior partitions at the floor, and rises to be discharged through openings at the ceiling. It enters air shaft 46 through register 48. The bath room is shown heated by a hot water radiator 51, and the kitchen by a hot water radiator 50. The gas refrigerator 144 in the kitchen is shown built into the regenerative air stream the same as the gas water heaters 67, 68, 69 (Fig. 1), so that all products of combustion are kept out of the living quarters. Fig. 5 shows the roof especially well insulated by outside insulating board 26 and inside insulating board 25.

Fig. 7 shows the reversing valves 147 and 148 in the heat pump gas circuit pipe 146 of heat exchanger 8, and the reversing valves 149 and 150 in the heat pump gas circuit pipe 145 of heat exchanger 7. When motor 157, driving worm and worm wheel 156, 155 throws connecting rod 154 and reversing bar 153 to the left, as shown, then the pipe 146 from the top of heat exchanger 8 is connected to pipe 151 (through valve 147). Pipe 151 goes to the pressure side of the gas pump 62, and pipe 145 from the top of heat exchanger 7 is connected to pipe 152 through valve 150. Pipe 152 goes to the vacuum side of pump 62.

With this connection, heat exchanger 8 is the condenser and heat exchanger 7 is the evaporator, and the heat flow is to the house air conditioning stream driven by fan 32. Heat exchanger 7 extracts part of the heat which the regenerative air stream receives from the interior of the house through the inner insulating shell 22, 22 (Fig. 5) and through insulating wall 27, 27 in the basement. The remainder of this heat passes out of the house through the outer shell wall including the roof, the house sides 21, 21, and the basement foundation wall. This escaping heat establishes a heat drop across this outer shell wall and this heat drop added to the outdoor temperature gives the higher temperature of the regenerative air stream from which the heat pump gets its heat.

When motor 157 throws reversing bar to the right (dotted line) as in hot weather, valves 147 and 150 are closed and valves 148 and 149 are opened so that heat exchanger 8 is now connected to the vacuum side of the pump and becomes the evaporator, and heat exchanger 7 is connected to the pressure side and becomes the condenser, and the heat flow is now from 8 to 7 and the house air stream is cooled, the heat leaving with air through window 3.

Fig. 8 shows a standard expansion valve 161 which operates automatically to valve refrigerant liquid (coming from the bottom of heat exchanger 8 by pipe 159) to heat exchanger 7 by way of pipe 163, and an expansion valve 160 operates to valve refrigerant liquid coming from the bottom of heat exchanger 7 via pipe 158 to heat exchanger 8 via pipe 162.

Figure 9:
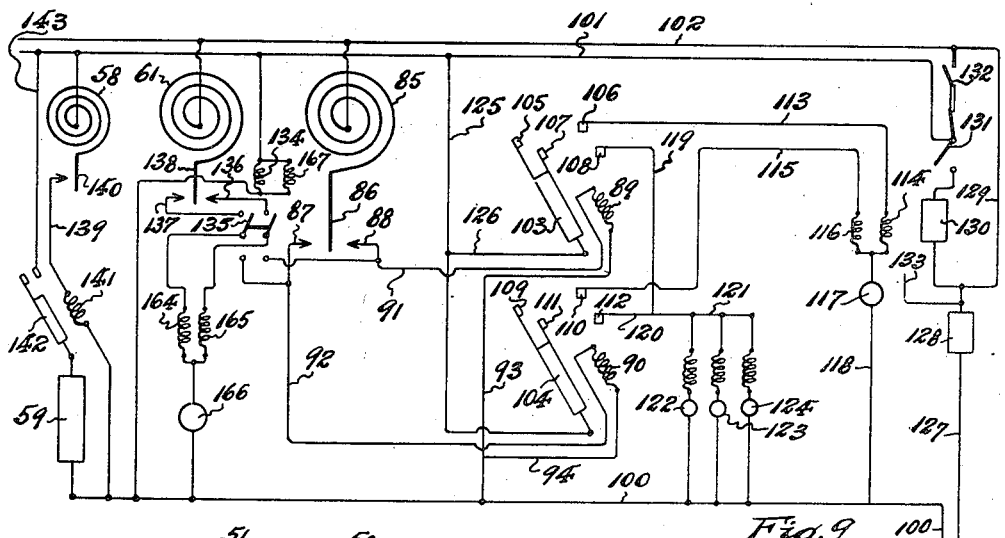
Fig. 9 is a one line control diagram.

Fig. 9 shows the two wires of a power service 100 and 127. A house service meter 128 registers the total use of general house service over wire 133 and house heating service over the day service wire 129; and the night service through night service meter 130. The electric utilities time switch 131 throws the heavy heating load over to the night meter 130 for the twelve night hours, and through switch 132 to the day service lead 129. Most utilities have a night heating rate of one cent per kw.-h. or lower, while the incremental day rate is generally about two to two and one-half cents. Where such high day rates occur and gas is available for heating, switch 132 will be left open and electric heating will be used only at night.

In the following discussion, switch 132 will be assumed to be open. When time switch 131 is open (day time) main 101 will be dead, coil 134 will be deenergized and the front contacts of contactor 135 will be open. The back contacts of contactor 135 will now be closed and damper motor 57 series opening field 165 will be connected to house thermostat contact 88 and damper motor closing field 164 will be connected to house thermostat contact 87. If now house thermostat 85 calls for more heat, moving contact 86 will contact stationary contact 88, and current will pass through damper motor field opening coil 165, motor armature 166 of motor 57 (Fig. 1). Motor will turn to very slowly open damper 38. Fan motor 32 is kept running off the twenty-four hour service main 102, so that as damper 38 is opened more heat is delivered to the recirculating house conditioning stream until thermostat 85 opens series field 165 and motor 57 stops. When the moving contact 86 of thermostat 85 contacts stationary contact 87 current flows through the closing field coil 164. Motor armature 166 and damper motor 57 turns to slowly close damper 38 to cut off the heat supply. Hot water storage tank 40 and associated radiator 41 are kept warm by the side arm gas water heaters 68 and 69 when power is cut off wire 101, and by electric heater 59 when 101 is alive. It is thus seen that in the day time, and when wire 101 is dead, the entire house heating control is through thermostat 85 and damper motor 57.

As soon as the utility company's line switch 131 closes to night meter 130, electric pump heat main 101 is energized, coil 134 is energized, the front contacts of contactor 135 closes, and transfers the damper motor 57 control to thermostat 61. Thermostat 61 is mounted in the regenerative air stream circuit as shown in Figs. 1 and 2. Its moving contact 138 is set to strike the fixed contact 136 to call for more heat and to strike the fixed contact 137 to call for less heat in exactly the same manner as thermostat 85. Thermostat 61 will be adjusted to open damper 38 for temperatures under about 40° F. and to close damper 38 for temperatures over 45° F.

Figure 10:
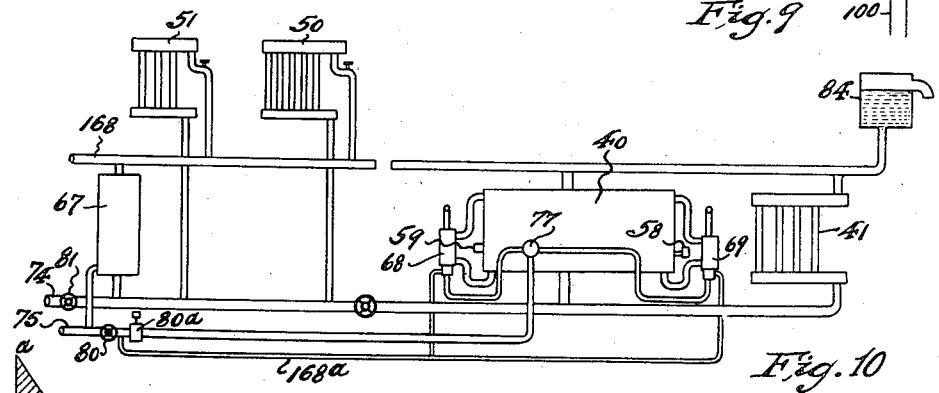
Fig. 10 is a diagram of main water and gas connection.

It will be obvious to one skilled in the art, that as damper 38 is opened more direct heat is supplied to the interior of the house, and consequently less pumped heat will be supplied. Since all heat that is supplied to the house that is not regenerated must pass through the outer shell, an increase in the temperature of the heat regenerating air stream must follow an increase in generated heat, and vice versa. Coil 167 is connected in multiple with coil 134 and is energized as soon as the utilities company's time switch 131 energized the pumped heat bus 101. Coil 167 when energized closes valve 80a (Fig. 10), and shuts off gas to the side arm burners 68 and 69. Hot water storage tank 40 is now heated by electric resistor element 59. This resistor element is energized by contactor 142, through wire 143. The closing coil 141 of contactor 142 is energized by hot water thermostat 58 (Fig. 10). When the temperature of the water in tank 40 falls below 170° F., the moving arm 140 of thermostat 58 energizes coil 141 and contactor 142 closes so as to heat the water. Room thermostat 85 when calling for more heat moves its moving contact 86 to stationary contact 88 and energizes coil 89 closing contactor 103 to call for heat. When the room is too hot, room thermostat 86 contacts stationary contact 87 energizing coil 90 through wires 92 and 94, thus closing refrigerator contactor 104. Heater contactor 103, in closing, energizes stationary contacts 106 and 108 through wires 125 and 126. Current flows through stationary contact 106, wire 113, field coil 144, motor armature 117 and wire 118 to rotate the armature of motor 157 (Fig. 7) to open valves 147 and 150 and close valves 148 and 149, so as to cause the gas pump 62 to pump compressed refrigerant gas into heat exchanger 8, whereupon heat exchanger 8 becomes a condenser and supplies pumped heat to the house air conditioning air stream. Contactor 103 in closing also energizes pump bus 121 over wire 119 so as to supply power to the armature 122 of pump motor 64 (Fig. 1). An additional pump would utilize motor armature 123. Bus 121 also supplies power to the armature 124 of fan motor 5 so that the closing of contactor 103 puts the heat pumping equipment into operation to pump heat into the house. If contactor 104 closes, it energizes stationary contact 112 which starts the heat pump equipment as before; however, it also energizes stationary contact 110 and sends current over wire 115 through field coil 116 of valve motor 157 (Fig. 7). This motor now operates to throw the valve bar 153 so as to open valves 148 and 149, and close valves 147 and 150, whereupon heat exchanger 7 becomes a condenser and heat exchanger 8 becomes an evaporator. Heat exchanger 8 now cools the house air conditioning air stream.

Fig. 10 shows the arrangement of the hot water circuits. A cold water service main 74 supplies cold water through valve 81 to the house hot water service boiler 67. This house hot water service boiler 67 supplies hot water to the service main 168, to the kitchen radiator 50, and to the bathroom radiator 51. Cold water main 74 also supplies make up water to the house hot water heating system so as to fill the overflow tank 84 to the overflow point. A gas main 75 supplies gas to the house service boiler 67, and through valves 80 and 80a to the thermostat valves 77. The thermostat valves 77 supply full gas pressure to side arm gas water heaters 68 and 69, whenever the water in tank 40 falls below 180° F. Hot water tank 40 supplies hot water to the large house heating radiator 41 located in hot box 39 (Fig. 2). Small gas pipe 168a by-passes a small amount of gas to keep the burners of heaters 68 and 69 lighted.

Figure 11:
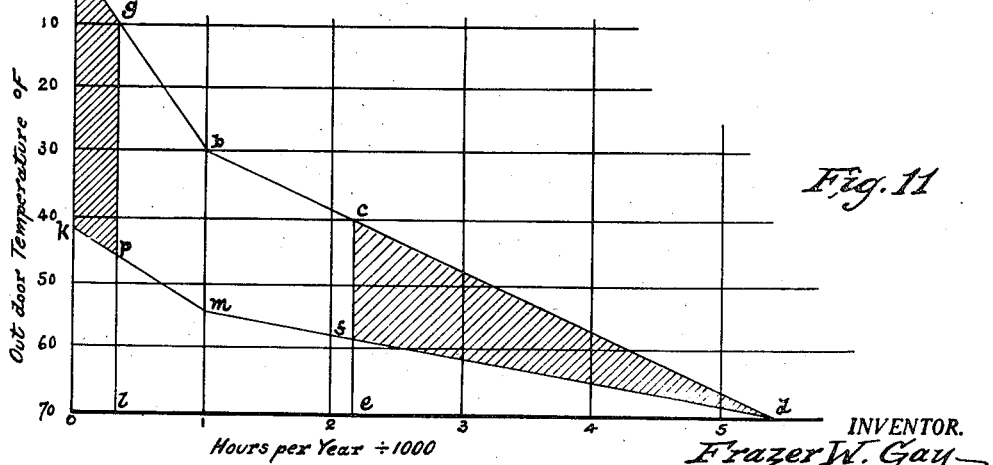
Fig. 11 is a curve illustrating the preferred method of operation.

Fig. 11 shows a curve a, b, d plotted against outdoor temperature degrees F. as ordinate and hours per year in thousands as abscissa. The area under curve a, b, d represents degree hours of heating required per year for any house. The area under the curve k, m, d represents the degree hours of heating required in the daytime, while the area between the two curves represents the degree hours of heating required at night. Since, as we have seen, the electric rates at night are so low that electric pumped heat is cheaper than gas heat, it would seem obvious that the heat pump should be run all night every night. This arrangement, however, would give the gas company an unsatisfactory revenue for the service rendered, accordingly the electric utility blocks open switch 131, and the gas company is given the entire night and day load during the hours from l to e. The electric company carrying the balance of the night load as represented by the area dcfd and the area agpk. The advantage of this method of operation is as follows:

In the metropolitan district of New York, Philadelphia, Pittsburgh, and similarly located cities, temperatures down to 10° F. are common, and the gas utilities are well equipped to handle the gas demand for temperatures down to 10° F. Temperatures lower than 10° F. are comparatively rare and the gas utility is not prepared to carry such a load, particularly if the low temperature period should be prolonged. In such an event the time switch 131 (which has been assumed blocked open when the outdoor temperature reached 40° F. i. e. point c on curve abd, Fig. 11), is put back into service and the electric utility picks up the entire night load. If the gas emergency becomes extreme, or in case of a gas company disaster, switch 132 may also be closed and the electric utility will pick up the entire heating load (day and night).

The following examples illustrate the purposes and mode of operation of this invention, and for the sake of simplicity it is assumed that electrically produced heat is introduced directly into the air stream moving in the space intermediate the inner and outer insulating shells or walls, in a house having substantially 3600 square feet of wall space, and wherein the inner insulating wall consists of fireproof board ¼ air space and 1 inch of insulating board and plaster. This entire wall will conduct ¼ B. t. u. per square foot of surface per degree F., or 900 B. t. u. per degree integrated for the entire 3600 square feet of wall surface. The outer shell or wall consists of fireproof board ¼ air space, aluminum foil, one inch of insulating board sheathing and shingles. Such type of outer shell or wall conducts approximately 0.15 B. t. u. per square foot per degree, or 540 B. t. u. per degree F. for the entire area thereof.

With a 5 degree F. outside temperature, 540×35 or 18,900 B. t. u. per hour will be required to maintain a 35 degree F. drop across the outer wall so as to hold 40 degree F. temperature in the air stream space intermediate the inner and outer walls, and 35×900 or 31,500 B. t. u. per hour will be required to pass through the inner walls (22, 23 and 24, Fig. 5) in order to maintain the necessary 35 degree F. across the same. Now, if 23,800 B. t. u. per hour of electric energy (7 kw.) is liberated inside the house and flows to the outside, then the temperature drop across the inner walls will be 23,800 divided by 900, or about 26 degrees F., and the drop across the outer walls (16, 25 and 26, Fig. 5) will be 23,800 divided by 540, or about 44 degrees F. This provides a total drop of about 70 degrees F. in order to give a house interior temperature of about 75 degrees F. when it is 5 degrees F. out of doors. The heat drop per degree F. will be 23,800 divided by 70, or 340. Now if a heat pump taking 6,300 B. t. u. per hour of electric energy and delivering heat with an actual coefficient of performance of 5 is used, then there will be delivered to the interior of the house 6,300×5, or 31,500 B. t. u. per hour, and this heat flowing through said inner walls will produce a drop of 31,500 divided by 900 or 35 degrees. From the above it will be understood that 18,900 B. t. u. of energy must be used to produce the required 35 degree F. drop across said outer walls. The 6,300 B. t. u. of electric energy used to drive the heat pump escapes through the outer wall, so that there must be furnished to the space and air stream intermediate the inner and outer walls 18,900 less 6,300 or 12,600 B. t. u. per hour (3.7 kw.) of direct electric energy. But it has been shown above that 23,800 B. t. u. would be required with all direct electric heat delivered to the interior of the house. My novel system therefore saves 23,800 less 18,900 or 4,900 B. t. u. per hour, or about 20 per cent.

At an outside temperature of 15 degrees F., the heat pump (operating continuously 24 hours per day) would require as above 6,300 B. t. u. (1.85 kw.) of electric energy to produce the 35 degree F. drop across said inner walls. However, the drop across said outer walls will now be 25 degrees F. instead of 35 degrees F., and only 13,500 B. t. u. total of electric energy will be required, or 13,500 less 6,300 equaling 7,200 B. t. u. (2.1 kw.) delivered directly to the space and air stream intermediate the inner and outer walls. A 15 degrees F. outside temperature, the temperature drop from house interior to exterior will be 60 degrees F., and if all heat is generated electrically 60×340 or 20,400 B. t. u. (6 kw.) would be required. My system, in such case, saves therefore 20,400 less 13,500 or 6,900 B. t. u. per hour, or about 34 per cent.

At 25 degrees F., a frequent winter temperature, the heat pump would operate continuously 24 hours per day, and would also require 6,300 B. t. u. The drop across said outside walls, in order to maintain 40 degrees F. in the space and contained air stream intermediate the outside and inside walls, would be 15 degrees F., and the B. t. u. requirement would be 15×540 or 8,100

B. t. u. 8,100 less 6,300 or 1,800 B. t. u. (0.53 kw.) is therefore required in addition to the heat pump energy demand. If all heat is generated electrically within the house interior, the demand would be 50×340 or 17,000 B. t. u. It follows therefore, at an outdoor temperature of 25 degrees F., the use of my novel system will attain a saving, over direct electric generation of heat, of 17,000 less 8,100 or 8,900 B. t. u., which is a saving of about 52 per cent.

Since the heat pump, operating continuously to pump from the air stream intermediate said inner and outer walls into the house interior, takes 6,300 B. t. u. per hour or 1.85 kw., and since this 6,300 B. t. u. heat loss flows out of the building through said outside walls, said 6,300 B. t. u. will produce a drop of 6,300 divided by 540 which equals 11.6 degrees F. Therefore, for all outdoor temperatures below 40 degrees F. less 11.6 degrees F. or 28.4 degrees F. the heat pump will operate continuously, and directly generated electric heat will be introduced into the air stream intermediate said inner and outer walls as required, and in increasing amount proportional to the temperature drop below 28.4 degrees F., in order to maintain the air stream at 40 degrees F.

For the above conditions, said outdoor temperature of 28.4 degrees F. is the limiting outdoor capability temperature for the particular heat pump without necessity for use of additional heating equipment. For outdoor temperatures above 28.4 degrees F. but lower than 40 degrees F., the heat pump will operate intermittently. At 28.4 degrees F., the total electric energy requirement for the heat pump will be 6,300 B. t. u., and with direct electric heat 46.6 degrees F. times 340 or 15,800 B. t. u. At 28.4 degrees F., the heat pump saves 15,800 less 6,300 or 9,500 B. t. u. per hour or about 60 per cent.

At a temperature of 40 degrees F. and over, the heat pump may pump heat directly from outdoor air to house interior air in the usual manner.

The above illustrations indicate that by my novel system, a summer air cooling unit of small size may be economically employed for winter heating.

The above illustrations involve conditions relative to the heating of an unoccupied house. It is well known that lighting, cooking, body heat, etc. release heat in an occupied house which makes a substantial contribution to house heating requirements. If such contribution is taken into account, say e. g. as contributing 3000 B. t. u. per hour, and is added to the heat pump loss, it will be found that a heat pump of only 31,500 less 3,000 or 28,500 B. t. u. per hour will be required; and with a heat pump of 5 coefficient of performance, the heat pump may be slowed down, and the energy used thereby will be reduced 28,500 divided by 5 or 5,700 B. t. u. per hour, and the drop in temperature across said outside walls of the house will be 5,700 plus 3,000 or 8,700 B. t. u. per hour divided by 540 or about 16 degrees F., and the limiting outdoor capability temperature will be 40 degrees less 16 degrees or about 24 degrees F. Since in the region about metropolitan New York for example, the number of hours per year during which outdoor temperature falls below 24 degrees F. is small, the amount of direct electric energy required to be used will also be small. It will also be understood that infiltration of air with respect to the house interior is considerable and causes additional heat loss which is not taken into account in the above illustrations, but such loss is more or less offset by solar energy, since it will also be understood that solar energy, which also has not been taken into account in the above illustrations, contributes substantially to house heating, and on the average yields much more than is lost by infiltration.

Having now described my invention, I claim:

1. A warm chamber, spaced inner and outer heat insulated walls surrounding said warm chamber, a heat pump including two heat exchangers between which heat is pumped back and forth as desired, a recirculating fluid in said warm chamber including a first one of said two heat exchangers in its recirculating course and a second recirculating fluid filling the space between said inner and outer walls and including in its recirculating course the second one of said two heat exchangers.

2. An outer heat insulating shell and an inner heat insulating shell spaced apart to provide an intermediate passageway separated from a cool outside, said spaced shells enclosing a chamber, a first warm fluid filling said chamber, a second lower temperature fluid filling the space passageway between said outer shell and said inner shell, heat pumping equipment comprising compressor cylinders having substantially one half the displacement required to pump the necessary heat from out doors, said equipment being arranged to transfer heat from said second lower temperature fluid to said first warm fluid, and heat storage means adapted in very cold weather to maintain the temperature of said second lower temperature fluid at a value suited to the capacity of said heat pump equipment.

3. A house heating device comprising a thermal enclosure formed by spaced outside and inside insulating layers, a first recirculating air stream in the passageways between said insulating layers, a heat exchanger in said first recirculating air stream adapted to extract heat from said air stream, a second recirculating air stream including in its recirculating course both the house rooms and the passageways in inside partitions, a heat exchanger in said second recirculating air stream, and heat pump means connected to receive heat from the heat exchanger in said first recirculating air stream and to deliver said heat to the heat exchanger in said second recirculating air stream.

4. In a house heating undertaking, for a house using a heat pump of limited temperature range for summer cooling, means to make available to said heat pump for return to said house for heating a portion of the heat escaping from said house, and said means adapted to make said heat available at a temperature substantially above the outdoor temperature, said means including a heat insulated air chamber substantially surrounding said house and means to extract heat from said chamber.

5. A house heating undertaking wherein a first fluid circulates through the house interior, a first heat exchanger in the recirculating path of said first fluid, a thin envelope provided by spaced inner and outer insulating walls substantially surrounding said house interior, said envelope containing a second recirculating fluid, a second heat exchanger in the path of the envelope recirculating course, heat pump means of limited displacement adapted to pump heat extracted from said second heat exchanger to said first heat exchanger, whereby, in cold weather, a major part of the temperature drop between outside air and house interior air is produced by pumped heat passing through the inner insulating wall to the envelope interior and a minor part of said temperature drop is produced by heat pump losses and losses passing through the outer insulating wall of said envelope.

6. In a house heating undertaking, a first heat exchanger arranged to deliver heat to the interior of said house, a thin envelope formed by spaced inner and outer insulating walls substantially surrounding said house interior and containing a recirculating fluid, a second heat exchanger in the course of said recirculating fluid, a heat pump of relatively small displacement capable of pumping required heat through a temperature range substantially less than maximum indoor or outdoor range and arranged to pump heat from said second heat exchanger to said first heat exchanger, said heat pump being adapted to maintain a relatively large temperature drop across said inner insulating wall, the normal house heat losses and the heat pump losses passing through said outer insulating wall whereby to produce a substantial heat drop between said second heat exchanger and the outdoor air, so that the second heat exchanger is at a sufficiently high temperature to evaporate refrigerant in sufficient quantity to carry the required heat to said first heat exchanger.

7. In a house heating undertaking, a house structure including spaced inside and outside insulating walls surrounding the house interior, whereby to provide an air space intermediate said walls, a heat pump means having a relatively small cylinder volume adapted to operate upon a refrigerant at relatively high pressure and at a temperature well above outdoor temperature, means to abstract heat escaping from the house interior through said inside wall into the air within said air space and then return said heat by said heat pump means into the house interior together with the heat losses of said heat pump means, whereby the total pumped heat delivered into the house interior establishes a relatively large thermal drop across said inside wall of the air space while the losses of the heat pump means establishes a lesser thermal drop across said outside wall of the air space, so that the air in said space is maintained at a temperature substantially above outdoor temperature.

8. In a house heating undertaking, an inner chamber to be heated containing a circulated fluid, a thin envelope surrounding said inner chamber containing a second recirculated fluid, said envelope comprising spaced inner and outer insulated walls, heat exchanger means to extract heat from said second recirculating fluid, another heat exchanger means to impart heat to said first circulated fluid, heat pump means adapted to receive heat from said first mentioned heat exchanger means and pump the thus extracted heat at an intermediate temperature to the second mentioned heat exchanger means at highest temperature, said extracted heat plus said heat pump losses acting to produce a major temperature drop across the inner walls of said envelope with the heat losses of the heat pump being effective to produce a minor temperature drop across said outer wall of said envelope and thus between said second recirculating fluid and the exterior ambient air.

FRAZER W. GAY.

REFERENCES CITED

The following references are of record in the file of this patent:

UNITED STATES PATENTS

| Number | Name | Date |
|---|---|---|
| 1,969,187 | Schutt | Aug. 7, 1934 |
| 2,008,407 | Stoever | July 16, 1935 |
| 2,151,713 | Niemann | Mar. 28, 1939 |
| 2,294,038 | Kucher | Aug. 25, 1942 |
| 2,324,971 | Woodward | July 20, 1943 |
| 2,364,220 | Johnson | Dec. 5, 1944 |
| 2,364,287 | Gould | Dec. 5, 1944 |
| 2,376,859 | Benn | May 29, 1945 |